`US006916403B2`

United States Patent
Basler et al.

(10) Patent No.: US 6,916,403 B2
(45) Date of Patent: Jul. 12, 2005

(54) EMBOSSED SHEET MATERIAL AND METHOD

(75) Inventors: Michel Basler, Issenheim (FR); Benoît Hoeft, Bischwihr (FR)

(73) Assignee: Georgia-Pacific France, Kunheim (FR)

( * ) Notice: Subject to any disclaimer, the term of this patent is extended or adjusted under 35 U.S.C. 154(b) by 89 days.

(21) Appl. No.: 10/318,598

(22) Filed: Dec. 12, 2002

(65) Prior Publication Data

US 2004/0081804 A1 Apr. 29, 2004

(30) Foreign Application Priority Data

Dec. 27, 2001 (EP) .............................. 01403377

(51) Int. Cl.⁷ .............................. B31F 1/07; B32B 1/00; D21H 27/40
(52) U.S. Cl. ................. 162/117; 162/123; 162/132; 428/154; 428/174; 156/209
(58) Field of Search .................. 162/117, 123, 162/132–133, 111–113; 428/153–154, 1, 156, 174, 172, 196, 195.1, 537.5, 537; 156/209, 219, 242

(56) References Cited

U.S. PATENT DOCUMENTS

| | | | |
|---|---|---|---|
| 3,414,459 A | | 12/1968 | Wells |
| 3,867,225 A | | 2/1975 | Nystrand |
| 3,953,638 A | * | 4/1976 | Kemp .................. 428/154 |
| 3,961,119 A | * | 6/1976 | Thomas ................ 428/178 |
| 4,100,017 A | * | 7/1978 | Flautt, Jr. ............. 162/111 |
| 4,320,162 A | * | 3/1982 | Schulz ................. 428/154 |
| 5,620,776 A | * | 4/1997 | Schulz ................. 428/156 |
| 5,727,458 A | * | 3/1998 | Schulz ................. 101/24 |
| 5,736,223 A | * | 4/1998 | Laurent ................ 428/154 |
| 5,840,404 A | * | 11/1998 | Graff .................. 428/154 |
| 5,846,636 A | * | 12/1998 | Ruppel et al. ......... 428/154 |
| 5,874,156 A | * | 2/1999 | Schulz ................. 428/156 |
| 5,906,711 A | * | 5/1999 | Barnholtz ............. 162/132 |
| 6,251,207 B1 | * | 6/2001 | Schultz et al. ........ 156/209 |
| 6,287,676 B1 | * | 9/2001 | Ruppel et al. ......... 428/219 |
| 6,395,133 B1 | * | 5/2002 | McNeil ................ 162/132 |
| 6,681,826 B1 | * | 1/2004 | Biagiotti ............. 156/470 |
| 6,723,203 B2 | * | 4/2004 | Roussel et al. ........ 162/111 |
| 2002/0148579 A1 | * | 10/2002 | Roussel et al. ........ 162/111 |
| 2002/0160155 A1 | * | 10/2002 | Muller ................ 428/172 |
| 2003/0008109 A1 | * | 1/2003 | Basler et al. ......... 428/156 |
| 2003/0116292 A1 | * | 6/2003 | Hollmark ............. 162/132 |
| 2003/0198788 A1 | * | 10/2003 | Andersson et al. ..... 428/195.1 |
| 2003/0215602 A1 | * | 11/2003 | Andersson et al. ..... 428/116 |
| 2004/0074594 A1 | * | 4/2004 | Basler et al. ......... 156/184 |
| 2004/0081804 A1 | * | 4/2004 | Basler et al. ......... 428/174 |
| 2004/0121124 A1 | * | 6/2004 | Basler et al. ......... 428/154 |
| 2004/0163783 A1 | * | 8/2004 | Muller ................ 162/132 |

FOREIGN PATENT DOCUMENTS

| | | | |
|---|---|---|---|
| BE | 841 455 | 11/1976 | |
| EP | 0 426 548 A1 | 5/1991 | |
| EP | 0 796 728 A2 | 9/1997 | |
| EP | 01 40 3377 | 5/2002 | |
| WO | WO 9631652 A1 * | 10/1996 | .......... D21H/27/02 |
| WO | WO 97/27365 | 7/1997 | |

* cited by examiner

*Primary Examiner*—José A. Fortuna
(74) *Attorney, Agent, or Firm*—Quarles & Brady LLP

(57) ABSTRACT

The sheet including at least a first and a second ply of tissue paper exhibiting a specific surface weight of between 10 and 40 g/m² and being embossed and assembled in a way that the protrusions defining the embossing patterns point to the inside of the sheet and subtend cavities between them is characterized in that the first ply (F1) is fitted with first frustoconical protrusions (100') of which each top surface is between 0.3 and 4 mm², the second ply (F2) includes second protrusions (200') configured to be facing the first protrusions in such a manner that the first protrusions are precluded from being inserted between the second protrusions.

15 Claims, 2 Drawing Sheets

EMBOSSED SHEET MATERIAL AND METHOD

Figure 1:
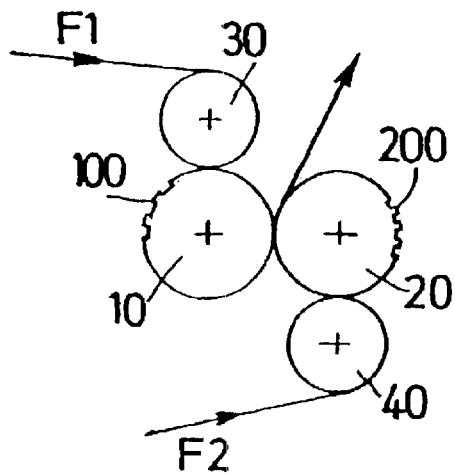

The present invention relates to sanitary or household absorbent papers. In particular, it applies to a sheet including at least two embossed plies of cellulose web, hereafter tissue paper, for use for example in toilet paper, handkerchiefs and other equivalent products.

In this field, tissue paper denotes an absorbing paper of low specific surface weight of 10 to 40 g/m². In general, this paper will be creped. The sheet also may be a single foil, in this instance being called "ply". The sheet may consist of two or more plies to constitute a double, triple or multiple sheet depending on the number of plies.

Creping allows the sheet to stretch and this property is used to deform the sheet and impart thickness to it. Such processing also affects the paper's properties such as its mechanical strength. In particular, the processing improves it softness and its touch.

Embossing is applied either to a very moist paper, that is in the wet part of the papermaking machine, or on comparatively dry paper, that is after the sheet has been manufactured and dried in the finishing process. The present invention relates to embossing paper in the dry portion of the machine.

Conventionally, the sheet is embossed by being made to pass between a cylinder having a rigid surface and a cylinder made of a material, for example rubber, that deforms when compressed against the rigid surface. The rigid surface is fitted with embossing tips corresponding to a pattern that is to be imprinted on the sheet of paper. Cylinder engraving techniques are well known.

Most often the embossing patterns consist of a sequence of elementary embossing tips of small cross-section and simple geometry. Illustratively, the embossing tips assume a generally frustoconical shape with a circular or oval base. They may also assume the shape of a pyramidal frustrum having a polygonal base. Following embossing, the sheet has protrusions on one side and the corresponding cavities on the other. At the exit of the embossing equipment, the protrusion contours are substantially the same as those of the embossing tips. The protrusion height depends on the embossing pressure and on the more or less pronounced penetration of the rubber into the embossing cylinder's engraving.

Depending on the intended use of the product, the protrusion repeat frequency and their height is determined commensurately. Be it noted that the size of the embossing tips is reciprocal to the protrusion repeat frequency. For instance, for a household paper towel where absorption is to be maximized, the protrusion density is between 5 and 20 protrusions/cm² and their height may reach 2 mm. In this case their top is comparatively wide.

In particular as regards toilet paper, applicant has developed patterns with a higher element density, between 30 and 80 embossing tips/cm². In this case the embossing tips' height is shallow and their top surface also is much less. It is less than 1 mm². European patent 426,548 shows an embodiment of a two-ply sheet. This kind of embossing, called micro-embossing, concerns mostly the properties based on sheet thickness. It is known that embossing with relatively high density and relatively shallow height of the embossing tips will offer substantial crush resistance and does feel thick when handled. For constant protrusion height, a less dense embossing pattern will not offer the same feel of thickness.

This is also the case for more complexly-shaped embossing tips which are farther spaced apart than are the frustoconical embossing tips. The top of such embossing tips assumes an elongated, so-called linear shape.

Applicant developed a mixed embossing structure (WO 97/27365) composed of two tissue paper plies having a specific surface weight of between 10 and 40 g/m². The two plies are embossed with different patterns and the protrusions point to the sheet's inside in such a way as to subtend cavities between them. A first ply is embossed in a first pattern consisting of pattern elements which are comparatively far apart from each other and which consist of first protrusions having elongated tops.

The second ply is embossed in a second pattern of 30 protrusions/cm² of small cross-section.

In particular, the first pattern elements are individually inscribed in a polygon subtending a surface of 2 to 6 cm² and their density is less than 2000/cm².

The large patterns of this design impart an especially attractive appearance to the sheet. However they entail the drawback that adhesive bonding is concentrated into the zones. Accordingly, there is danger that the product's touch will not be homogeneous.

Applicant desired to develop a structure of which the outer patterns are frustoconical protrusions in order to attain a product with homogeneous touch. Moreover, this kind of protrusion makes possible a very great variety of aesthetic patterns. However, applicant noted that if arbitrary frustoconical embossing tips were used to emboss the first ply, an inversion effect would be the result in the product. "Inversion effect" means forming a boss on the outer surface of the second ply. This boss degrades the softness at the sheet's surface and imparts to it a rough feel.

Applicant also developed a method protected by French patent Application 00 06108 which in particular allows improving a product's visual perceptibility by embossing the outer ply more while retaining adequate strength because the inner ply is unembossed. However, when the patterns consist of protrusions in the form of discrete elements (rather than continuous lines for example), the inversion effect would then be especially marked because of the smoothness of the inner ply.

Therefore, the objective of the present invention is a product of the above cited kind that in particular is free of the second ply's inversion effect.

According to the invention, a sheet of at least two plies, namely a first and a second ply, each of tissue paper and exhibiting a specific surface weight of between 10 and 40 g/m², which are embossed and joined to each other in such a way that the protrusions defining the embossing patterns are configured toward the inside of the sheet and subtend cavities between them, is characterized in that the first ply comprises first frustoconical protrusions of which the top surface is between 0.3 and 4 mm², the second ply comprises second protrusions facing the first protrusions in such a manner that the first protrusions are precluded from inserting themselves between the second protrusions.

The product's inversion effect can be restricted by using complementary patterns such as the protrusions of a first ply that cannot be inserted (in a final product) between the micro-embossed protrusions of a second ply.

Surprisingly, it was found that if the first ply's protrusions were to make contact with the second ply by means of the latter's protrusions, the inversion effect would be substantially reduced and even eliminated.

Moreover, such a structure also can improve the visual perceptibility of the first ply's embossing pattern. In case the second ply is micro-embossed, one essential purpose of micro-embossing being to increase product thickness, there is no longer a need to embed the first ply's embossing pattern in a micro-embossing pattern. Consequently the first protrusions can be exploited visually.

Advantageously the first ply directly contacts the second ply.

Preferably the surface of the top of the first protrusions each are between 0.5 and 2 mm².

In particular the surface at the top of the second protrusions is between 0.03 and 1.2 mm² and especially between 0.10 and 0.8 mm².

The sheet in any of the above embodiments is characterized in that the second protrusions exhibit a density exceeding 30 protrusions/cm², preferably exceeding 40 protrusions/cm².

In another embodiment of the invention, the sheet is characterized in that the first ply furthermore comprises second protrusions of the kind present in the second ply.

In a special case, the protrusions of both plies are frustoconical with a circular base, a relation can be defined between the pitch of the inner ply's micro-embossing and the diameters of the two kinds of protrusions. This relation assures that the first protrusions of the first ply cannot insert themselves between the second protrusions of the second ply regardless of how the plies are lined up.

Accordingly, the sheet of one of the embodiments of the invention is characterized in that the protrusions of the two plies having a circular base follow the inequality below $$D > ([P_{ad}]^2 + [P_{tr}]^2)/P_{max} - d$$

where

D is the diameter at the top of the smallest first protrusions of the first ply, d is the diameter at the top of the micro-embossing protrusions of the second ply, $P_{ad}$ is the pitch in the direction of advance of the second ply's micro-embossing, $P_{tr}$ is the pitch in the transverse direction of the second ply's micro-embossing, $P_{max}$ is the largest of the pitches of $P_{ad}$ and $P_{tr}$.

In another embodiment, the sheet is characterized in that one of the first and second plies is made conventionally (CWP) and in that another ply is made by through-air-drying (TAD).

The invention also relates to an associated embossing method allowing in particular manufacture of a sheet exhibiting the above features.

The method for embossing and joining a sheet is characterized in that it comprises the following steps:

(a) embossing a first ply on a first embossing cylinder fitted with first embossing tips of a height between 0.4 and 2 mm and of a surface at the top between 0.3 and 4 mm², (b) embossing a second ply on a second embossing cylinder fitted with embossing tips of a height between 0.3 and 1 mm and of a surface at the top between 0.3 and 1.2 mm², the tips being distributed in a way that the first embossing tips cannot be inserted between the second embossing tips, and (c) assembling the plies configuring the first embossing tips on the second embossing tips in the manner defined in stage (b).

In another implementation of the invention, the embossing and joining method of a sheet is characterized by comprising the following steps:

(a) embossing a first ply on a first embossing cylinder fitted with first embossing tips of a height between 0.4 and 2 mm and of a top surface between 0.3 and 4 mm², (b) embossing a second ply on a second embossing cylinder having embossing tips of a height between 0.3 and 1 mm and of a top surface between 0.03 and 1.2 mm² and of which the distribution is such that the first embossing tips cannot be inserted between the second embossing tips, and (c) detaching the first ply from the cylinder surface and contacting it with the second ply using a joining cylinder joining the two plies.

Various embodiments of the invention are elucidated below in relation to the attached drawings.

Figure 2:
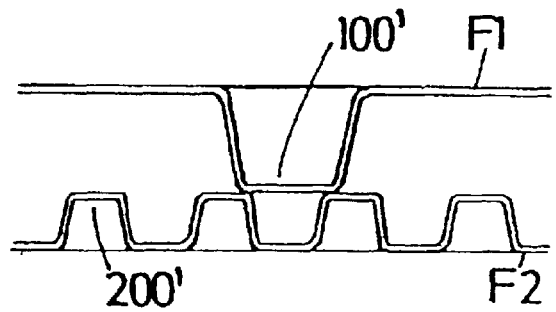
Figure 4:
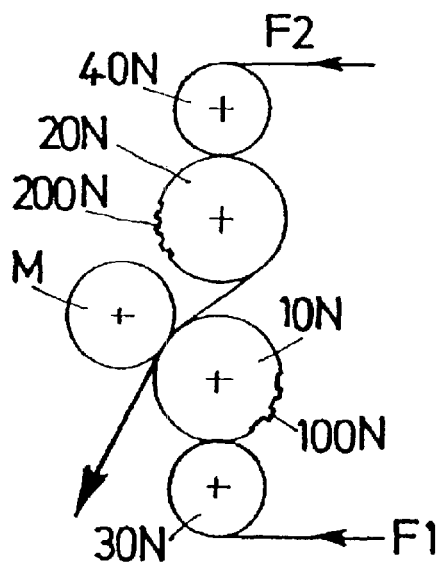
Figure 3:
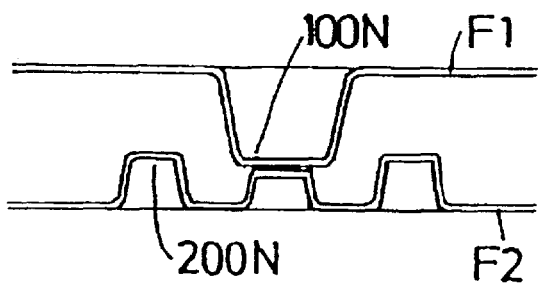
Figure 5:
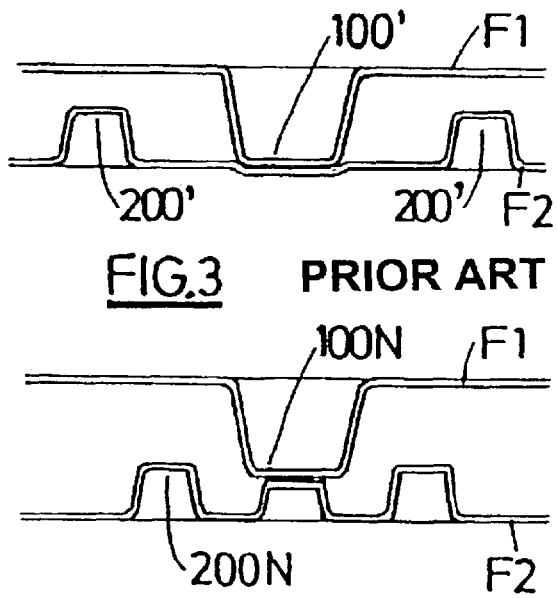
Figure 7:
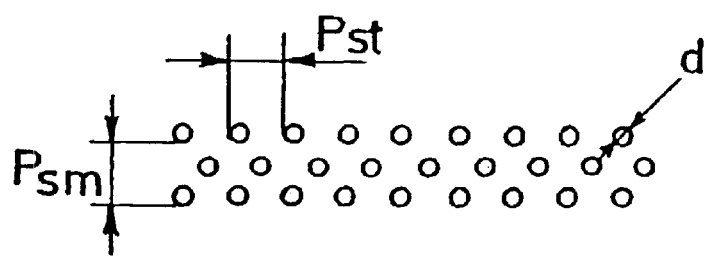
Figure 6A:
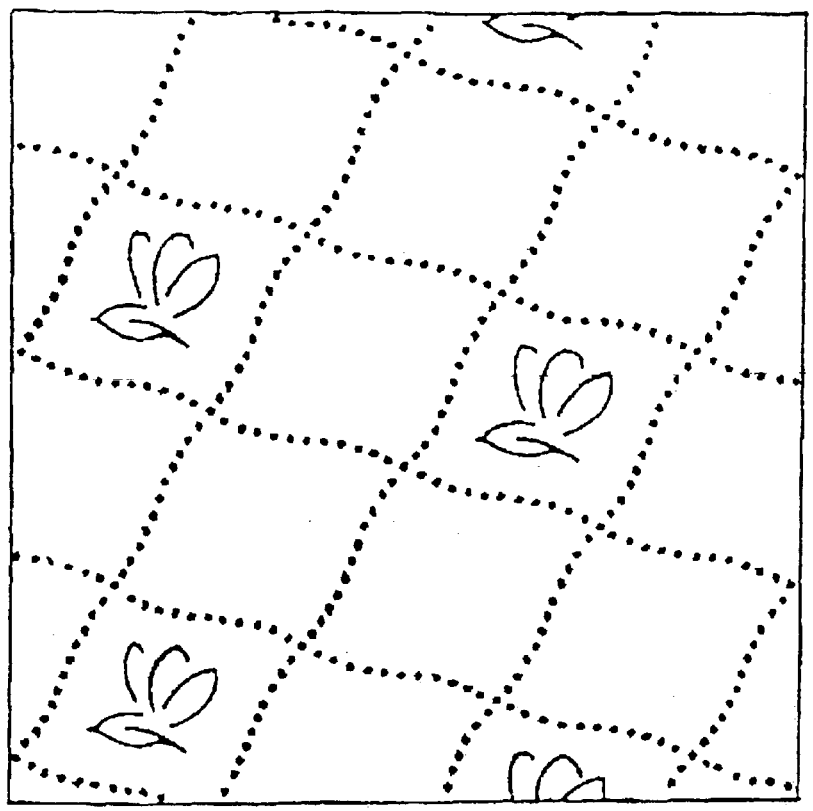
Figure 6B:
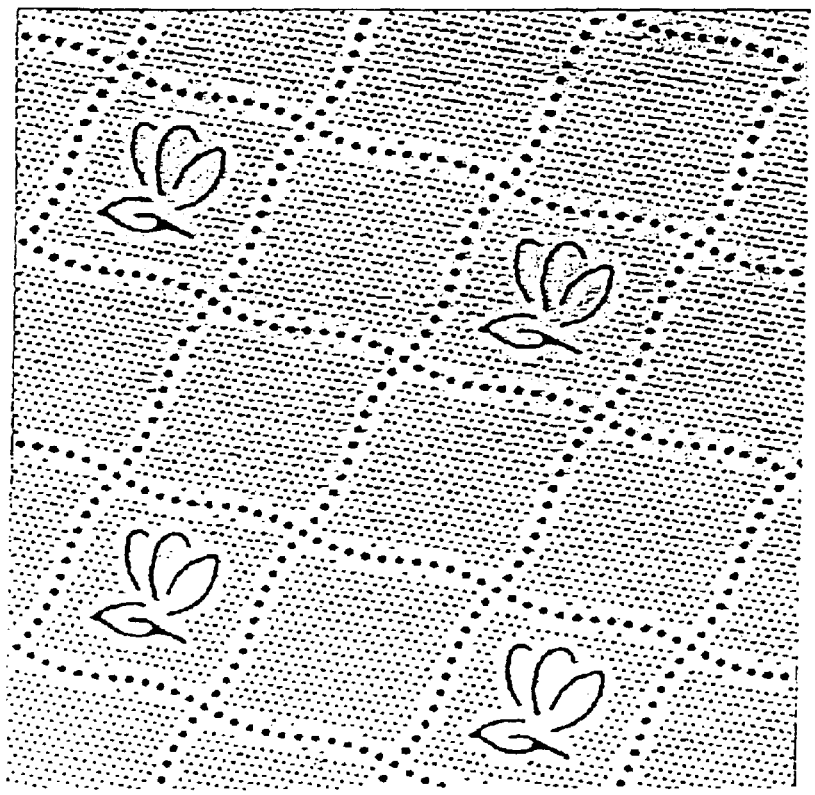

FIG. 1 schematically shows an embossing and joining assembly joining two tissue paper plies in the tip-to-tip mode, FIG. 2 is a section of a two ply sheet of the invention made using the assembly of FIG. 1, FIG. 3 is a section of a two ply sheet of the prior art, FIG. 4 is another assembly for embossing and joining in a nested manner two tissue paper plies, FIG. 5 is a section of another two ply sheet of the invention made using the assembly of FIG. 4, FIGS. 6a, 6b show illustrative first ply embossing patterns in one implementation of the invention, and FIG. 7 illustrates an array of protrusions.

FIG. 1 shows a first assembly for embossing and tip-to-tip joining of two tissue paper plies to form a double sheet. This assembly comprises a first embossing unit with a first steel cylinder 10 cooperating with a first rubber cylinder 30 and a second embossing unit with a second steel cylinder 20 cooperating with a second rubber cylinder 40.

The first cylinder 10 is engraved with a pattern consisting of embossing tips 100 and the second cylinder 20 is engraved with a pattern consisting of embossing tips 200.

The two cylinders 10 and 20 are mutually parallel and roll on each other without slippage.

The height of the first embossing tips 100 is between 0.4 and 2 mm. Their surface at the top is selected to be between 0.3 and 4 mm², preferably between 0.5 and 2 mm². The embossing tips' cross-section illustratively is circular although it can be oval.

The height of the second embossing tips 200 is between 0.3 and 1 mm. Their surface at the top is between 0.03 and 1.2 mm² but preferably between 0.10 and 0.8 mm². The density of the embossing tips is at least 30 embossing tips/cm² in the zone where the second embossing tips 200 make contact with the first embossing tips 100.

A first ply F1 is guided from a not shown supply reel to pass around the first rubber cylinder 30. It passes through the embossing gap subtended between the two cylinders 10 and 30 and, under the compression of the rubber cylinder 30, hugs the topography of the first engraved cylinder 10. In this manner, protrusions 100' are imprinted into the first ply. Illustratively, the specific surface weight of the ply is between 20 and 23 g/m².

The second ply F2 is guided from a not shown supply reel to pass around the second rubber cylinder 40. It passes through the embossing gap subtended between the two cylinders 20 and 40 and follows the topography of the engraved cylinder 20 to be imprinted with protrusions 200'. The specific surface weight of the second ply can be between 18 and 21 g/m².

The two plies are joined to each other in the gap subtended between the cylinders 10 and 20. Illustratively, depositing adhesive on the tops of the protrusions 100' imprinted on the first ply, the two plies are joined when making contact in the gap 10–20. The two plies also can be made to adhere using a knurling system downstream of the gap 10–20.

In the manner of the invention, furthermore, the pattern of the second embossing cylinder 20 is defined in a way that the protrusions 100' of the ply F1 always rest against at least one protrusion 200' of the second ply F2 (FIG. 2).

If it were otherwise, and as illustrated in FIG. 3 showing the prior art, the protrusion 100' would directly contact the second ply between two protrusions 200'. As a result a boss would appear on the opposite surface and would entail an inversion effect to the touch.

In a highly schematic manner, FIG. 4 shows an embossing assembly in the so-called nested mode. A first embossing unit comprises an engraved cylinder 10N and a rubber cylinder 30N as in the previous embodiment. This assembly also comprises a second embossing unit with an engraved cylinder 20N and a rubber cylinder 40N. The two units are configured in such a way that the steel cylinders 10N and 20N are apart from each other. A joining cylinder M cooperates with the cylinder 10N in linking the plies. A first ply F1 is embossed between the cylinders 30N and 10N. A second ply F2 is embossed between the cylinders 20N and 40N. The ply F2 detaches off the cylinder 20N and is then applied against the cylinder M. The joining cylinder presses against the ply F2. If a layer of adhesive was deposited on the tops of the protrusions 100'N, the two plies would be linked to each other once downstream of the joining cylinder.

As shown in FIG. 5, and according to the present invention, the pattern of the protrusions 200'N precludes the top of the protrusions 100'N from making direct contact with the bottom of the ply F2 between two protrusions 200'N. As a consequence, the protrusions 200'N that make contact with the protrusions 100'N are partly crushed but on the other hand they circumvent a boss being formed on the second ply. Short of this design step, the inversion effect would be pronounced because the joining cylinder presses against the tops of the protrusions 100'N which at that instant rest on the embossing tips 100N.

As regards the embodiment shown in FIG. 6a, the first ply comprises protrusions 100' resting on at least one smaller protrusion 200' of the second ply.

In another product embodiment, the first ply illustrated by FIG. 6b comprises additional protrusions besides the first ones and of the kind of the second ply, that is smaller ones.

In either method, furthermore, glueing the plies can be replaced by knurling them, this technique being known to the expert.

Moreover, as regards embossing tips having circular bases, the inequality above can be used to reliably prevent the large protrusions of the first ply from inserting themselves between the micro-embossed protrusions of the second ply. As regards this kind of micro-embossing, consisting of protrusions of a diameter d of 0.4 mm that are distributed at a density of about 80 embossing tips/cm$^2$, the pitch $P_{ad}$ in the direction of advance of this pattern is about 1.4 mm and the pitch $P_{tr}$ in the transverse direction is 1.75 mm. It is found that the diameter D of the first ply's protrusions must be larger than 1.05 mm. FIG. 7 shows an illustrative distribution of these protrusions. They are configured in parallel and staggered rows.

The invention was compared with a control.

The same tissue paper was used on the same machinery under the same operating conditions. Two series of toilet paper rolls were made, one in the manner of the prior art and the other according to the invention.

As regards the former product, the second ply, which is inside when the sheet is a roll, is smooth. Externally the first ply is embossed in a flower pattern having large and cross-sectionally circular frustoconical protrusions with a diameter of about 1.2 mm and small protrusions of which the diameter is about 0.4 mm which are distributed at a pattern density of 80 embossing tips/cm$^2$. This pattern is shown in FIG. 6b. These two plies are glued to each other by means of the large embossing tips and the flowers.

As regards the latter embodiment, the inner ply is embossed into a pattern uniquely composed of small protrusions 0.4 mm in diameter and exhibiting a density of 80 embossing tips/cm$^2$. The outer ply is embossed into a pattern identical with the previous one except that the small protrusions were withdrawn. This pattern is shown in FIG. 6a.

Preferably the product is glued at the large protrusions and at the flowers.

It was found that the products made by the two methods exhibit similar properties except for softness which is higher in the latter product. This softness differential is attributed to the attenuated inversion effect attained in the invention at the large protrusions.

The method that was used allows testing and comparison of the softness of standard products, of novel products and of competing products relative to a control.

Where toilet rolls are involved, they are put into a "black" box fitted with dispensing elements (5 test specimens and one control). The control is on the left.

Approximately 30 sheets/roll (test specimen included) are removed before the roll is put into the dispenser.

Test:

Each testing person compares the specimens in sequence and relative to the control and assigns to each a softness grade.

A checking person enters in a summary page the classification of each sample, the testing person being denoted by a letter.

The summary page holds 7 categories of values.

Each category is assigned a coefficient from +3 to −3:

No difference when the softness is the same,

Probably softer when following short hesitation a positive difference is perceived relative to the control, Softer when this difference is perceived without hesitation, Really softer when the softness differential is obvious.

The same rating is applied in the opposite direction for products of lesser softness.

After they have moved beyond the testing person, the two first sheets of each roll will be eliminated.

Results:

A grade is derived for each softness ruing category by multiplying the number of testing persons by the coefficient.

The final result is given by dividing the sum of the grades by the number of testing persons.

Testing persons:

A minimum of 10 persons with well developed senses must be selected.

Following the above testing procedure, softness of one of our conventional products was rated at 1.2 whereas this rating rises to 1.4 with the novel product of the present invention, proof of substantial improvement.

What is claimed is:

1. A sheet comprising at least a first tissue paper ply and a second tissue paper ply, each ply having a specific surface weight of between 10 and 40 g/m$^2$ and each ply having an embossment pattern and being joined to each other in such a way that protrusions defining the embossment pattern are directed inward in the sheet and subtend cavities therebetween, wherein the first ply comprises first frustoconical protrusions having a top area of between 0.3 and 4 mm$^2$, the second ply comprises second frustoconical protrusions configured to face the first protrusions in a way that said first protrusions are precluded from insertion between the second protrusions; and wherein the first protrusions on the first ply are larger than the second protrusions on the second ply and wherein the second ply has only the second protrusions, each of the first protrusions and the second protrusions having at least one of a circular base and an oval base.

2. Sheet as claimed in claim 1, wherein the first ply directly contacts the second ply.

3. Sheet as claimed in claim 1, wherein the top area of each of the first protrusions is between 0.5 and 2 mm².

4. Sheet as claimed in claim 1, wherein the top area of each of the second protrusions is between 0.03 and 1.2 mm².

5. Sheet as claimed in claim 1, wherein the top area of the second protrusions is between 0.10 and 0.8 mm².

6. Sheet as claimed in claim 1, wherein the second protrusions are distributed in a density exceeding 30 protrusions/cm².

7. Sheet as claimed in claim 1, wherein the first ply further comprises second protrusions which are configured according to the second protrusions of the second ply.

8. Sheet as claimed in claim 1, wherein the first protrusions and the second protrusions are frustoconical and have a circular base and conform to:

$$D > ([P_{ad}]^2 + [P_{tr}]^2)/P_{max} - d$$

where

D is a diameter of a top of a smallest of the first protrusions of the first ply, d is a diameter of a top of micro-embossing protrusions present in the second ply, $P_{ad}$ is pitch in a direction of advance of the micro-embossing of the second ply, $P_{tr}$ is pitch in a transverse direction of the micro-embossing of the second ply, $P_{max}$ is largest of the pitch of $P_{ad}$ and $P_{tr}$.

9. Sheet as claimed in claim 1, wherein one of the first ply and the second ply is a CWP-made ply and the other ply is a TAD-made ply.

10. A method for embossing and assembling a sheet, said method comprising:

(a) embossing a first ply on a first embossing cylinder fitted with first embossing tips having a height of between 0.4 and 2 mm and each tip thereof having a top area of between 0.3 and 4 mm², (b) embossing a second ply on a second embossing cylinder fitted with second embossing tips having a height between 0.3 and 1 mm and each tip thereof having a top area of between 0.03 and 1.2 mm², and said first embossing tips and said second embossing tips being distributed in such a way that said first embossing tips are precluded from being inserted between the second embossing tips, and (c) assembling the first ply and the second ply by configuring the first embossing tips on the second embossing tips in a manner as defined in step (b); and wherein the first protrusions on the first ply are larger than the second protrusions on the second ply and wherein the second ply has only the second protrusions, each of the first protrusions and the second protrusions having at least one of a circular base and an oval base.

11. Method as claimed in claim 10, wherein the first ply and the second ply are joined to each other by depositing an adhesive on tops of the first protrusions.

12. Method as claimed in claim 10, wherein the first ply and the second ply are joined by knurling.

13. Method for embossing and assembling a sheet, comprising:

(a) embossing a first ply on a first embossing cylinder fitted with first embossing tips having a height between 0.4 and 2 mm and each tip having a top area of between 0.3 and 4 mm², (b) embossing a second ply on a second embossing cylinder fitted with second embossing tips having a height of between 0.3 and 1 mm and each tip thereof having a top area of between 0.03 and 1.2 mm², and (c) detaching the first ply from the cylinder and joining the first ply with the second ply using a joining cylinder; and wherein the first protrusions on the first ply are larger than the second protrusions on the second ply and wherein the second ply has only the second protrusions, each of the first protrusions and the second protrusions having at least one of a circular base and an oval base.

14. Method as claimed in claim 13, wherein the first ply and the second ply are joined to each other by depositing an adhesive on tops of the first protrusions.

15. Method as claimed in claim 13, wherein the first ply and the second ply are joined by knurling.

* * * * *

UNITED STATES PATENT AND TRADEMARK OFFICE
CERTIFICATE OF CORRECTION

PATENT NO. : 6,916,403 B2
DATED : July 12, 2005
INVENTOR(S) : Michel Basler and Benoit Hoeft It is certified that error appears in the above-identified patent and that said Letters Patent is hereby corrected as shown below:

<u>Column 6,</u>
Line 46, "ruing" should be -- rating --.

Signed and Sealed this

Twenty-ninth Day of November, 2005

JON W. DUDAS
*Director of the United States Patent and Trademark Office*